(12) United States Patent
de Buyer et al.

(10) Patent No.: US 8,069,766 B2
(45) Date of Patent: Dec. 6, 2011

(54) FOOD DICER

(75) Inventors: Julien de Buyer, Le Val d'Ajol (FR);
Jean Noël Mathieu, Vagney (FR)

(73) Assignee: De Buyer Industries, Le Val d'Ajol (FR)

( * ) Notice: Subject to any disclaimer, the term of this patent is extended or adjusted under 35 U.S.C. 154(b) by 815 days.

(21) Appl. No.: 12/054,294

(22) Filed: Mar. 24, 2008

(65) Prior Publication Data

US 2009/0133587 A1    May 28, 2009

(30) Foreign Application Priority Data

Nov. 26, 2007 (FR) .................................... 07 59 293

(51) Int. Cl.
*B26D 1/02* (2006.01)
*B26D 7/06* (2006.01)
*A47J 43/00* (2006.01)

(52) U.S. Cl. ................. 83/856; 83/858; 83/648; 99/537

(58) Field of Classification Search .................... 83/856, 83/440, 858, 697, 932, 440.2, 648; 99/537; 426/518; 29/592; 228/173.6
See application file for complete search history.

(56) References Cited

U.S. PATENT DOCUMENTS

| 6,732,622 | B2 | 5/2004 | Vincent | |
|---|---|---|---|---|
| 7,066,071 | B2* | 6/2006 | Zeder et al. | 83/698.11 |
| 2004/0231482 | A1* | 11/2004 | Boilen | 83/425.3 |
| 2005/0061124 | A1* | 3/2005 | Vincent | 83/247 |
| 2006/0081108 | A1 | 4/2006 | de Buyer | |
| 2009/0123623 | A1* | 5/2009 | Tweg | 426/518 |
| 2009/0255391 | A1* | 10/2009 | Hood et al. | 83/648 |

* cited by examiner

*Primary Examiner* — Ghassem Alie

(74) *Attorney, Agent, or Firm* — Squire, Sanders & Dempsey (US) LLP

(57) ABSTRACT

A manual food dicer includes a frame equipped with a cross blade and two guiding rails, a carriage movable in translation, and a longitudinal cutting knife equipped with triangular blades, wherein the knife cooperates with positioning mechanism enabling it to be elastically mounted between a working position in which the triangular blades jut out over the upper surface of the frame, and wherein a retracted position in which the triangular blades are retracted, the translation of the carriage causing the knife to move into retracted position.

26 Claims, 5 Drawing Sheets

FOOD DICER

This application claims the priority of French Patent Application No. 07 59 293, filed Nov. 26, 2007, the entire disclosure of which is incorporated herein by reference.

BACKGROUND AND SUMMARY OF THE INVENTION

One object of the present invention is to provide a food dicer, such as a manual food dicer enabling vegetables to be cut into sticks or cubes.

The food dicer can be used at home but is above all intended for cooking professionals.

Such a food dicer, which is conventionally referred to as a "mandoline", preferably complies with a series of requirements specific to this field of use, given in particular the agitation that generally reigns in kitchens when preparing dishes.

It preferably allows a whole variety of vegetables to be cut very rapidly.

It is also preferred that the dicer does not expose users to the risk of cutting themselves.

In addition, it preferably enable the cutting features to be selectively and rapidly changed without requiring any complex dismantling.

It also be preferred that the dicer is easily and correctly cleanable without any risk of bacteria building up due to inaccessible food residues.

A food dicer of the present invention can meet some or all of these requirements.

Such a food dicer substantially may comprise a frame equipped with a cutting blade cross-mounted opposite a cut vegetable slot and two parallel lateral columns defining two guiding rails as well as a carriage movable in two-way translation along these rails and a preferably removable longitudinal cutting knife equipped with a set of equidistant triangular blades located opposite the cross blade, in line with the cut vegetable slot and substantially perpendicular to this blade.

According to the present invention, the carriage firstly includes a guide chamber formed by an substantially rectangular guiding plate equipped with a circular median opening and extending around this opening by a cylindrical wall delimiting at its internal part a chamber for receiving the vegetables to be cut, and secondly of a pusher rotatably mobile about the cylindrical wall of the guide chamber into which it is fitted and capable of being held by the user so as to move the carriage in a two-way movement along the guiding rails while constantly exerting pressure on the vegetables contained in the receiving chamber so as to apply them against the cross cutting blade and to enable them to be cut by this blade.

The two-way translation of the carriage along the guiding rails is divided into a series of active phases during which the vegetables are cut by the blades and of ineffective carriage return phases.

It will be understood that, within the scope of the present invention, the term "vegetables" is considered in the broad sense of the word and the cut vegetables may not only be any type of vegetables per se (potatoes, cucumber, carrots, etc.) but also fruits or other foodstuffs that can be cut.

On the whole, users are satisfied with a manual food dicer of this type which is described in the document U.S. Pat. No. 6,732,622 B2 as an example.

It is advantageously equipped with a mechanism for setting the height of cut and with several removable and interchangeable cross blades capable of being selectively positioned on the frame, in particular with blades equipped with straight cutting edges and blades equipped with serrated cutting edges so as to obtain smooth or grooved slices.

The possibility of making the pusher rotate about the cylindrical wall of the guide chamber during the two-way translation motion of the carriage further enables a "wafer"-type cut to be obtained.

Moreover, the longitudinal cutting knife enables the vegetables to be cut into sticks.

In addition, it is advantageous to equip the food dicer with several longitudinal cutting knives that differ by the distance between the triangular blades so as to vary the width of these sticks.

It shall however be noted that during the return phases of the carriage, the triangular blades of the longitudinal cutting knife, the end of which juts out slightly over the frame, damage the vegetables to be cut that are present in the receiving chamber.

Moreover, such a food dicer does not enable vegetables to be cut into cubes.

An object of the present invention is to provide a food dicer capable of remedying these disadvantages, while keeping the advantages inherent in the known manual food dicer described above.

For this purpose, an object is to provide a food dicer of the abovementioned type characterized in that the longitudinal cutting knife cooperates with a positioning mechanism enabling it to be elastically mounted on either side of the frame between firstly a working position in which the triangular blades clearly jut out over the upper surface of the frame so as to enable the vegetables to be cut into sticks or cubes during the active phases and towards which the longitudinal cutting knife automatically returns in the absence of any external stress exerted thereon, and secondly a retracted position in which the triangular blades are retracted into the cut vegetable slot.

The translation of the carriage during the return phases automatically causes the longitudinal cutting knife to move into retracted position.

Therefore, the food dicer conforming to the present invention differs by the particular mounting of the longitudinal cutting knife that enables the triangular blades of this knife to clearly jut out over the frame during the active phases of the two-way translation of the carriage to enable a satisfying cut of the vegetables, but to be retracted into the cut vegetable slot during the carriage return phases so as to avoid any damage of the vegetables contained in the receiving chamber.

Moreover, a ninety-degree rotation of the pusher about the cylindrical wall of the guide chamber during each of the phases of the two-way translation motion of the carriage enables cube cuts to be obtained, which was not possible with the abovementioned known manual food dicer.

The manual food dicer forming an object of the present invention may advantageously rest on at least one preferably folding stand.

As an example, the frame may advantageously be mounted onto two folding trapezoidal stands, i.e. a front stand and a rear stand, substantially in the form of a U.

The front stand enables the front of the frame to be raised.

The rear stand enables the food dicer to be used on a recipient such as a basin by using it as support; such support is stable and consequently secures the use of the food dicer.

In addition, the food dicer being supported by the front stand and the rear stand enables a more comfortable working angle to be obtained.

It shall further be noted that the food dicer conforming to the present invention is generally equipped with a series of longitudinal cutting knives the blades of which are more or less significantly distanced so as to obtain sticks or cubes of different sizes.

According to a preferred characteristic of the present invention, the mechanism for positioning the longitudinal cutting knife are symmetrical relative to the longitudinal axis of the frame and principally comprise two receiving slides for receiving this knife and two activating cams.

These elements are respectively located opposite one another on either side of the frame.

The receiving slides are mounted movable in translation along the lateral columns of the frame, substantially perpendicular to the longitudinal axis thereof and are respectively subjected to the action of a return spring.

The two activating cams are mounted movable in rotation on the lateral columns of the frame, about a cross pin; they engage with an associated receiving slide and cooperate with the guide chamber to enable the longitudinal cutting knife to move between the working position and the retracted position during the two-way translation of the carriage.

Each of the receiving slides is preferably mounted in a slot pierced in one of the lateral columns of the frame in which it can move in translation.

Thus, these slides comprise, on either side of this slot, firstly an internal part equipped with devices for holding the longitudinal cutting knife, and secondly an external part equipped with a lug whereby it engages with the return spring. These slots can advantageously be covered, on their external face, by a cover defining a housing for the external part of the receiving slide and for the return spring.

According to another characteristic of the present invention, the devices for holding the longitudinal cutting knife firstly includes bosses and/or recesses provided on the internal face of the internal part of the receiving slides and cooperating with corresponding recesses and/or bosses provided on the lateral faces located opposite the longitudinal cutting knife, and secondly of rotating strips enabling this knife to be blocked at its lower face.

It is advantageous for these bosses and recesses to be unsymmetrical on either side of the frame so as to ensure that the longitudinal cutting knife is always mounted in the right direction.

The rotation of the rotating strips enables this knife to be blocked on the frame or to be extracted therefrom.

According to a preferred characteristic of the present invention, each of the activating cams comprises a main sector rotatably mobile along the internal face of the associated lateral column extending outwards by a pivot moving in a curved oblong orifice pierced in this column and jutting out over the external face thereof.

This pivot engages with an operational upper face of the external part of the associated receiving slide to enable the longitudinal cutting knife to move towards the retracted position.

To control this movement, the main sector of each of the activating cams advantageously comprises an operating ramp engaging with the guide chamber during the return phases of the carriage.

Given this configuration and starting from the working position, during a return phase of the carriage, the front edge of the guiding plate of the guide chamber engages with the operating ramp of the activating cams and causes these cams to rotate about their axis.

This rotation causes the pivots to move in the curved oblong orifices and consequently to move towards the arm of the receiving slides, against the force of the return springs.

The longitudinal cutting knife is thus moved into retracted position and remains in that position while the guiding plate of the guide chamber is situated in line with the activating cams.

At the end of the carriage return phase, the rear edge of the guiding plate of the guide chamber moves beyond the activating cams and thus releases them.

The return springs then exert an upwards force on the lugs to move the receiving slides and consequently the pivots of the activating cams in the curved oblong orifices, which automatically causes these cams to rotate.

The longitudinal cutting knife is thus moved into working position and remains in that position during the next active phase of the carriage motion to enable an efficient cut of the vegetables, until, at the start of the subsequent carriage return phase, the front edge of the guiding plate of the guide chamber again engages with the operating ramp of the activating cams and so on and so forth.

It shall be noted that, within the scope of the present description, the terms "high" and "low" refer to a food dicer standing on a flat surface, in operating position.

According to another characteristic of the present invention, the cylindrical wall of the guide chamber extends beyond the guiding plate by a flange equipped with a series of recesses positioned so as to enable the triangular blades of the longitudinal cutting knife to pass during the active phases of the two-way translation of the carriage.

Corresponding grooves can also be provided on the lower face of the guiding plate.

It shall be noted that the position of these recesses and grooves is chosen so as to enable all the blades of the different longitudinal cutting knives equipping the manual food dicer conforming to the present invention to pass.

According to another characteristic of the present invention, the upper part of the frame has a non-stick coating improving the sliding of the vegetables to be cut.

Preferably, this coating does not extend over the entire width of the frame, but only to its median part so as to enable vegetables to be automatically centred during the two-way motion of the carriage along the frame.

BRIEF DESCRIPTION OF DRAWINGS

The characteristics of the food dicer of the present invention will be described in greater detail in relation with, but not limited to the enclosed drawings, in which.

DETAILED DESCRIPTION OF PREFERRED EMBODIMENTS OF THE INVENTION

Figure 1:
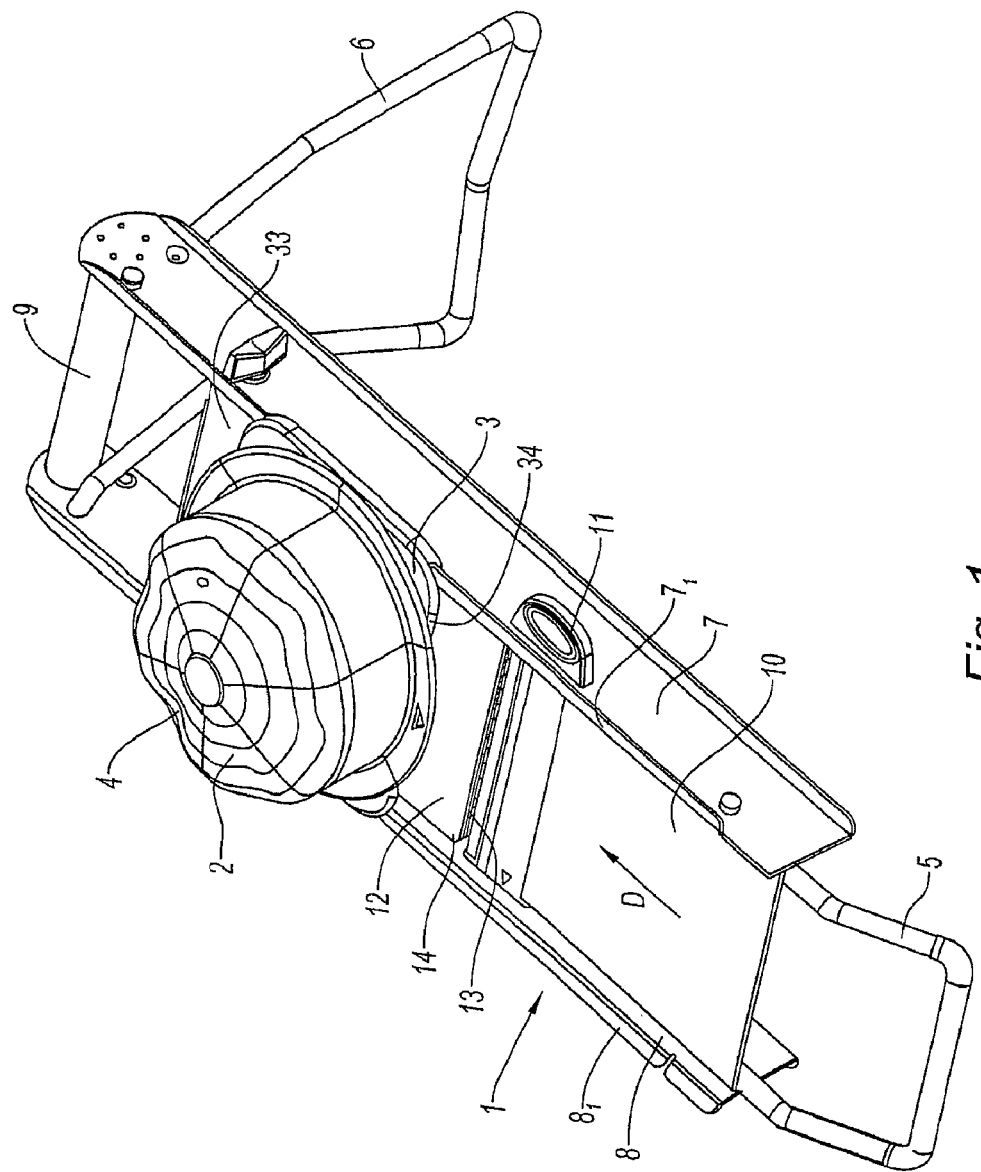
FIG. 1 is a perspective view of the food dicer.

According to FIG. 1, the food dicer principally includes a frame 1 and a carriage 2 itself having a guide chamber 3 and a pusher 4.

The frame 1 is mounted onto two trapezoidal stands substantially in the form of a U, i.e. a front stand 5 and a rear stand 6.

This frame 1 principally includes two parallel lateral columns 7, 8 linked by a cross operating handle 9 and by a bridge 10 on which a cross cutting blade 11 can slide and secondly a setting ramp 12 for setting the height of cut a first end 13 of which is situated opposite the cutting blade 11 so as to define a cut vegetable slot 14 for the cut vegetables to pass.

The upper edges 7.1, 8.1 opposite the stands 5, 6 of the lateral columns 7, 8 of the frame 1 define two guiding rails of the guide chamber 3.

Figure 5A:
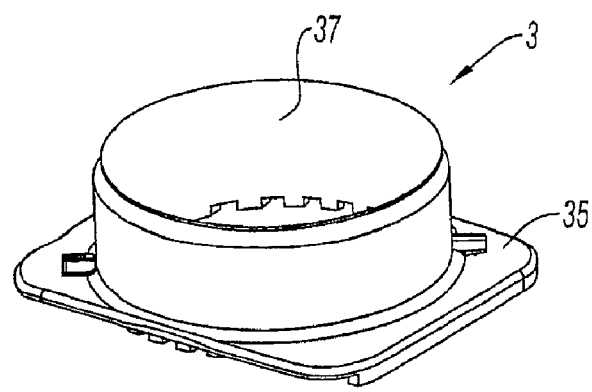
FIGS. 5a, 5b and 5c are perspective views representing the guide chamber from different angles.
Figure 5B:
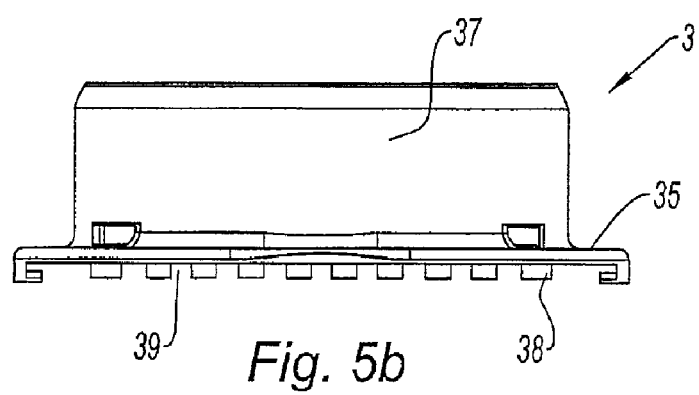
Figure 5C:
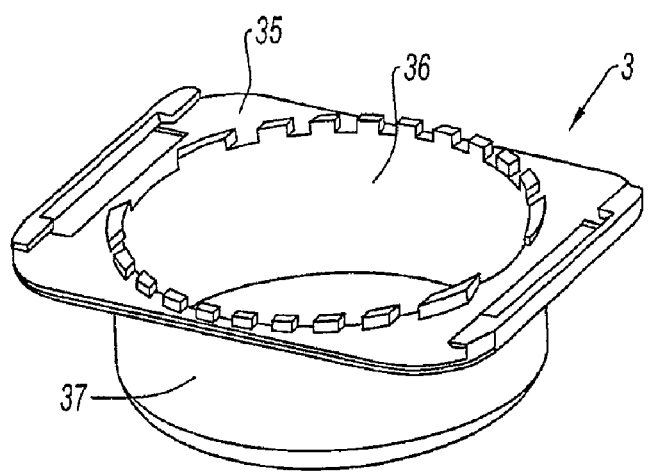

According to FIGS. 5a, 5b and 5c, the guide chamber 3 is formed by a substantially rectangular guiding plate 35 having a circular median opening 36 and extending around this opening by a cylindrical wall 37 delimiting at its internal part a chamber for receiving the vegetables to be cut.

The pusher 4 is movable in rotation about the cylindrical wall 37 of the guide chamber 3 into which it fits and is capable of being held by the user so as to enable the two-way motion of the carriage 2 along the guiding rails 7.1, 8.1 while constantly exerting pressure on the vegetables contained in the receiving chamber so as to apply them against the cross cutting blade 11 and to enable them to be cut by this blade.

The configuration of these different elements is to a large extent similar to that of the corresponding elements of the manual food dicer described in the prior abovementioned document FR 2 825 043 and for this reason will not be described in detail in the present description.

In a manner not represented in the figures, the upper part of the frame 1 has, at the height of cut setting ramp 12, a non-stick coating improving the sliding of the vegetables to be cut.

This coating does not extend over the entire width of the frame 1 but only to its median part so as to enable the vegetables to be automatically centred during the two-way motion of the carriage 2 along the frame.

Figure 2:
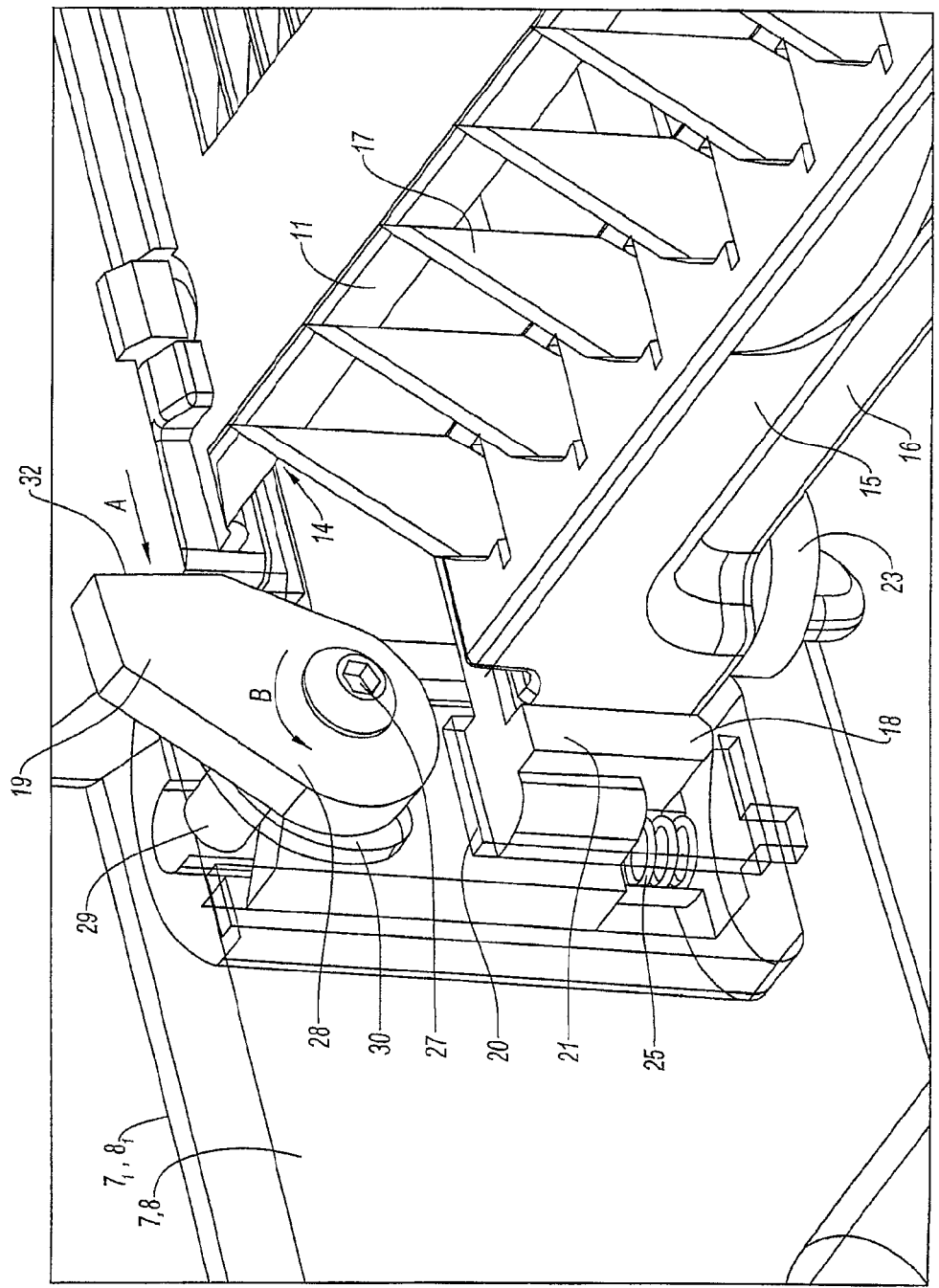
FIG. 2 is a perspective view representing a detail of the internal face of a lateral column showing the configuration of the mechanism for positioning the longitudinal cutting knife in working position.

According to FIG. 2, the food dicer is further equipped with a removable longitudinal cutting knife 15 mounted between the lateral columns 7, 8 of the frame 1.

This knife 15 includes a body 16 made of a synthetic or metallic material equipped with a set of equidistant triangular blades 17 located opposite the cross blade 11 in line with the cut vegetable slot 14 for the cut vegetables to pass.

The triangular blades 17 are oriented perpendicular to the blade 11 so as to enable the vegetables to be cut into sticks or cubes.

In a manner well-known per se and according to FIG. 1, the two-way translation of the carriage 2 along the guiding rails 7.1, 8.1 is divided into a series of active phases during which the vegetables are cut by the blades 11, 17 and of return phases of the carriage 2 that are ineffective.

Figure 3:
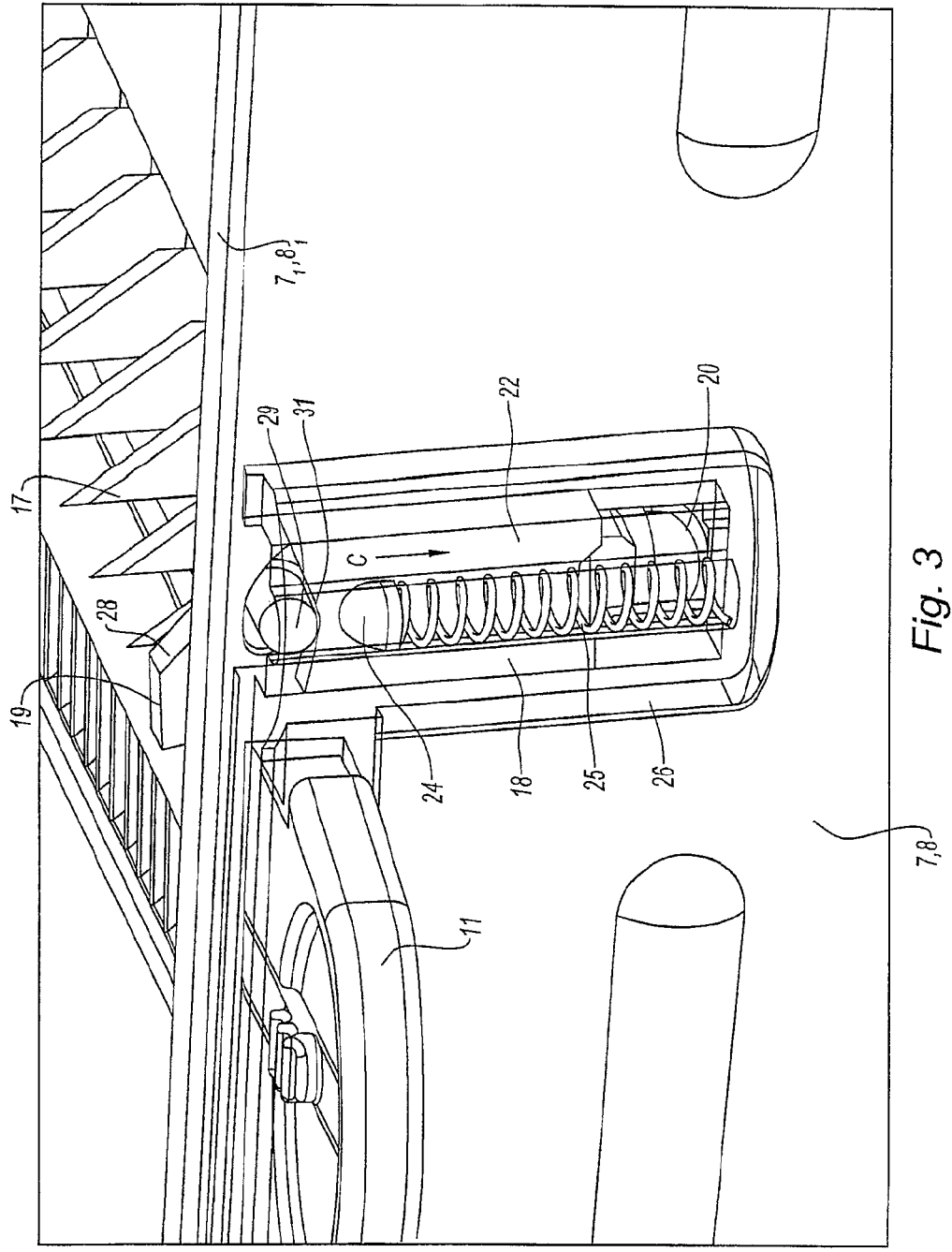
FIG. 3 is a perspective view representing a detail of the external face of a lateral column showing the configuration of the mechanism for positioning the longitudinal cutting knife in working position.
Figure 4:
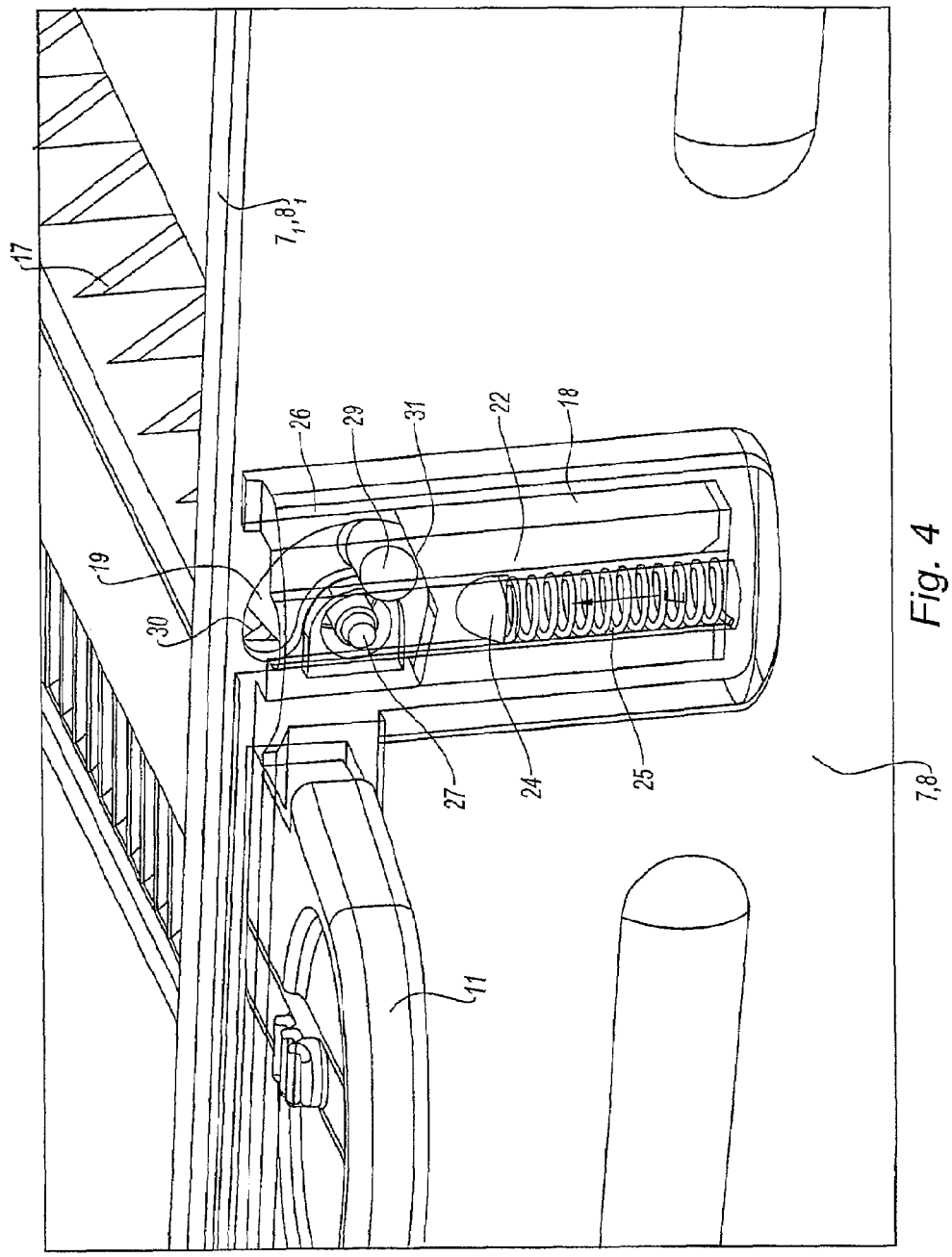
FIG. 4 is a view similar to FIG. 3 but showing the configuration of the mechanism for positioning the longitudinal cutting knife in retracted position.

As it will be subsequently described in greater detail in the present explanation, the frame 1 comprises a mechanism for positioning the longitudinal cutting knife 15 that are represented in FIGS. 2, 3 and 4.

These positioning mechanism, which are symmetrical relative to the longitudinal axis of the frame 1, enable this knife 15 to be elastically mounted on either side of the lateral columns 7, 8 of the frame 1 between a working position represented in FIGS. 2 and 3 in which the triangular blades 17 clearly jut out over the upper surface of the frame 1 and a retracted position represented in FIG. 4 in which the triangular blades 17 are retracted in the cut vegetable slot 14 for the cut vegetables to pass.

According to FIGS. 2, 3 and 4, the positioning mechanism principally include two receiving slides 18 receiving the longitudinal cutting knife 15 that are located opposite one another, and of two activating cams 19 that are also opposite one another.

The figures only represent one of these elements 18, 19, but it will be understood that they are similar on either side of the frame 1.

According to FIGS. 2, 3 and 4, the receiving slide 18 is mounted in a slot 20 pierced in the associated lateral column 7, 8 substantially perpendicular to the longitudinal axis of the frame 1 and can move in translation along this slot.

The slide 18 comprises, on either side of the slot 20, firstly an internal part 21 represented in greater detail in FIG. 2, and secondly an external part 22 represented in greater detail in FIGS. 3 and 4.

The internal part 21 of the receiving slide 18 is equipped with devices for holding the longitudinal cutting knife 15.

These holding devices have bosses and/or recesses not represented in the figures which cooperate with corresponding recesses and/or bosses provided on the lateral faces opposite the longitudinal cutting knife 15.

The devices for holding the longitudinal cutting knife 15 also have rotating strips 23 that enable this knife 15 to be blocked at its lower face.

According to FIGS. 3 and 4, the external part 22 of the receiving slide 18 is equipped with a lug 24 engaging with a return spring 25.

The lateral column 7, 8 is covered by a cover 26 on its external face, in line with the slot 20.

This cover 26 defines a housing for receiving the external part 22 of the receiving slide 18 and the return spring 25.

For the sake of clarity, this cover has been considered to be transparent in FIGS. 2, 3 and 4.

According to FIGS. 2, 3 and 4, the activating cam 19 is mounted movable in rotation about a pin 27 integral with the associated lateral column 7, 8 of the frame 1 and cross directed relative to the longitudinal axis of this frame.

This cam 19 more precisely includes a main sector 28 comprising an operating ramp 32, adjoining the internal face of the associated lateral column 7, 8 and extending outwards by a pivot 29.

During the rotation of the activating cam 19 about its pin 27, the pivot 29 moves in a curved oblong orifice 30 that is pierced in the associated lateral column 7, 8.

According to FIGS. 3 and 4, the pivot 29 juts out over the external face of the associated column 7, 8 and engages with an operational upper face 31 of the external part 22 of the receiving slide 18.

According to FIGS. 1 to 4, the operating mode of the manual food dicer of the present invention is as follows:

At the start of an active phase of the two-way translation of the carriage 2 along the guiding rails 7₁, 8₁, the longitudinal cutting knife 15 and the positioning mechanism are in the working position represented in FIGS. 2 and 3.

More precisely, the pivot 29 of the activating cam 19 is located at the upper end of the curved oblong orifice 30 and the receiving slide 18 is held, under the effect of the return spring 25 that engages with the lug 24, in high position, at the upper end of the slot 20.

The longitudinal cutting knife 15 and the positioning mechanism are held in this position throughout this entire active phase, i.e. during the motion from top to bottom of the carriage 2 on the frame 1 so as to guarantee a satisfying cut into sticks or cubes of the vegetables contained in the receiving chamber by the triangular blades 17 which then clearly jut out over the external environment of the frame 1.

During the next return phase of the carriage 2, at the start of the motion from top to bottom of this carriage 2 along the guiding rails 7₁, 8₁, the front edge 33 of the guiding plate of the guide chamber 3 engages with the operating ramp 32 of the activating cams 19 as shown in the diagram by arrow A in FIG. 2, and causes the rotation of these cams which swing according to arrow B.

This rotation causes the pivots 29 to move in the curved oblong orifices 30 and consequently the receiving slides 18 to move downwards according to arrow C (FIG. 3) under the effect of the pressure exerted by the pivots 29 on the operational upper faces 31 of these slides 18, which is opposite the force of the return springs 25.

During this motion, the lugs 24 push on these return springs 25.

The receiving slides 18 are thus transferred into the low position represented in FIG. 4, so as to position the longitudinal cutting knife 15 in retracted position.

This knife 15 stays in this position while the guiding plate of the guide chamber 3 is situated in line with the activating cams 19.

At the end of the return phase of the carriage 2, the rear edge 34 of the guiding plate of the guide chamber 3 moves according to arrow D (FIG. 1) beyond the activating cams 19 along the guiding rails 7₁, 8₁ and thus releases these cams.

The return springs 25 then exert on the lugs 24 an upwards force shown in the diagram by arrow E in FIG. 4 so as to transfer the receiving slides 18 into the high position represented in FIG. 3 and to position the longitudinal cutting knife 15 in working position.

Simultaneously, the operational upper faces 31 of the receiving slides 18 push the pivots 29 of the activating cams 19 in the curved oblong orifices 30, which automatically causes these cams 19 to rotate in the opposite direction to arrow B (FIG. 2) about their pin 27 and the operating ramps 32 to move outwards from the frame 1.

The longitudinal cutting knife 15 remains in working position throughout the next active phase until, at the start of the subsequent return phase of the carriage 2, the front edge 33 of the guiding plate of the guide chamber 3 again engages with the operating ramp of the activating cams, and so on and so forth.

Simultaneously, the pivot 29 moves in the curved oblong orifice to take the cams 19 back into extended position so as to enable the guide chamber 3 to take the longitudinal cutting knife 15 back into retracted position again during the next return phase of the carriage 2 motion.

According to FIGS. 5a, 5b and 5c, the cylindrical wall 37 of the guide chamber 3 extends beyond the guiding plate 35 by a flange 38 having a series of recesses 39 positioned so as to enable the triangular blades 17 of the longitudinal cutting knife to pass during the active phases of the two-way translation of the carriage 2.

The invention claimed is:

1. A manual food dicer comprising:
    a frame having a cut vegetable slot, a cutting blade cross-mounted opposite the cut vegetable slot, and two parallel lateral columns including two guiding rails;
    a carriage movable in two-way translation along the guiding rails, the carriage including a guide chamber; and
    a longitudinal cutting knife including a set of blades located opposite the cross-mounted cutting blade, in line with the cut vegetable slot and substantially perpendicular to the cross-mounted cutting blade,
    wherein the two-way translation of the carriage along the guiding rails is divided into a series of active phases during which vegetables are cut by the blades and of ineffective carriage return phases, and
    wherein the longitudinal cutting knife cooperates with a positioning mechanism enabling the longitudinal cutting knife to be elastically mounted on either side of the frame between firstly a working position in which the blades of the longitudinal cutting knife jut out over an upper surface of the frame to enable the vegetables to be cut into sticks or cubes during the active phases and towards which the longitudinal cutting knife is automatically returned in the absence of any external stress thereon, and secondly a retracted position in which the blades of the longitudinal cutting knife are retracted into the cut vegetable slot, the translation of the carriage during the return phases automatically causing the longitudinal cutting knife to move into the retracted position,
    wherein the positioning mechanism includes a slide mechanism and a cam mechanism, the slide mechanism is mounted movably in translation along the lateral columns, substantially perpendicularly to a longitudinal axis of the lateral columns, and the cam mechanism is mounted movably in rotation on the lateral columns, engages the slide mechanism, and cooperates with the carriage to enable the longitudinal cutting knife to move between the working position and the retracted position during the two-way translation of the carriage.

2. The manual food dicer according to claim 1, wherein the slide mechanism includes two slides receiving the longitudinal knife located opposite one another, mounted movably in translation along the lateral columns, substantially perpendicularly to the longitudinal axis of the lateral columns, and respectively subjected to the action of a return spring, and the cam mechanism includes two activating cams located opposite one another, mounted movably in rotation on the lateral columns, about a cross pin, engaging the receiving slides, and cooperating with the carriage to enable the longitudinal cutting knife to move between the working position and the retracted position during the two-way translation of the carriage.

3. The manual food dicer according to claim 2, wherein each of the receiving slides is mounted in a slot pierced in one of the lateral columns of the frame, in which the receiving slide can move in translation, and each of the receiving slides comprises on either side of the slot:
    an internal part including devices for holding the longitudinal cutting knife and,
    an external part including a lug that engages the return spring.

4. The manual food dicer according to claim 3, wherein each of the slots comprises an external face covered by a cover defining a housing for the external part of the receiving slide and for the return spring.

5. The manual food dicer according to claim 4, wherein the devices for holding the longitudinal cutting knife include:
    bosses and/or recesses provided on an internal face of the internal part of the receiving slides and cooperating with corresponding recesses and/or bosses provided on the lateral faces located opposite the longitudinal cutting knife, and
    strips enabling the longitudinal cutting knife to be blocked at a lower face of the longitudinal cutting knife.

6. The manual food dicer according to claim 5, wherein each of the activating cams comprises a main sector rotatably mobile along an internal face of the associated lateral column extending outwards by a pivot moving in a curved oblong orifice pierced in the associated column and jutting out over the external face thereof to engage with an operational upper face of the external part of the associated receiving slide to enable the longitudinal cutting knife to move towards the retracted position.

7. The manual food dicer according to claim 6, wherein the main sector of each of the cams comprises an operating ramp engaging with the guide chamber during the return phases of the carriage so as to move the longitudinal cutting knife into the retracted position.

8. The manual food dicer according to claim 7, wherein the guide chamber comprises:
   a substantially rectangular guiding plate having a circular median opening, and
   a cylindrical wall extending around the circular median opening and surrounding a receiving chamber for receiving the vegetables to be cut, and wherein the cylindrical wall extends beyond the guiding plate by a flange including a series of recesses positioned so as to enable the blades of the longitudinal cutting knife to pass during the active phases of the two-way translation of the carriage.

9. The manual food dicer according to claim 8, wherein the frame comprises an upper part, and a non-stick coating is disposed on the upper part.

10. The manual food dicer according to claim 9, wherein the non-stick coating extends only to a median part of the frame.

11. The manual food dicer according to claim 3, wherein the devices for holding the longitudinal cutting knife include:
   bosses and/or recesses provided on an internal face of the internal part of the receiving slides and cooperating with corresponding recesses and/or bosses provided on the lateral faces located opposite the longitudinal cutting knife, and
   rotating strips enabling the longitudinal cutting knife to be blocked at a lower face of the longitudinal cutting knife.

12. The manual food dicer according to claim 3, wherein each of the activating cams comprises a main sector rotatably mobile along an internal face of the associated lateral column extending outwards by a pivot moving in a curved oblong orifice pierced in the associated lateral column and jutting out over the external face thereof to engage with an operational upper face of the external part of the associated receiving slide to enable the longitudinal cutting knife to move towards the retracted position.

13. The manual food dicer according to claim 12, wherein the main sector of each of the cams comprises an operating ramp engaging with the guide chamber during the return phases of the carriage so as to move the longitudinal cutting knife into the retracted position.

14. The manual food dicer according to claim 1, wherein the guide chamber comprises:
   a substantially rectangular guiding plate having a circular median opening, and
   a cylindrical wall extending around the circular median opening and surrounding a receiving chamber for receiving the vegetables to be cut, and wherein the cylindrical wall extends beyond the guiding plate by a flange including a series of recesses positioned so as to enable the blades of the longitudinal cutting knife to pass during the active phases of the two-way translation of the carriage.

15. The manual food dicer according to claim 1, wherein the frame comprises an upper part, and a non-stick coating is disposed on the upper part.

16. The manual food dicer according to claim 15, wherein the non-stick coating extends only to a median part of the frame.

17. The manual food dicer according to claim 3, wherein each of the activating cams comprises a main sector rotatably mobile along an internal face of the associated lateral column extending outwards by a pivot moving in a curved oblong orifice pierced in the associated lateral column and jutting out over the external face thereof to engage with an operational upper face of the external part of the associated receiving slide to enable the longitudinal cutting knife to move towards the retracted position.

18. The manual food dicer according to claim 17, wherein the main sector of each of the cams comprises an operating ramp engaging with the guide chamber during the return phases of the carriage so as to move the longitudinal cutting knife into the retracted position.

19. The manual food dicer according to claim 2, wherein the guide chamber comprises:
   a substantially rectangular guiding plate having a circular median opening, and
   a cylindrical wall extending around the circular median opening and surrounding a receiving chamber for receiving the vegetables to be cut, and wherein the cylindrical wall extends beyond the guiding plate by a flange including a series of recesses positioned so as to enable the blades of the longitudinal cutting knife to pass during the active phases of the two-way translation of the carriage.

20. The manual food dicer according to claim 2, wherein the frame comprises an upper part, and a non-stick coating is disposed on the upper part.

21. The manual food dicer of claim 1, further comprising a pusher fitted into the guide chamber and capable of being held by a user so as to move the carriage in the two-way translation along the guiding rails.

22. The manual food dicer of claim 21, wherein the pusher is rotatable mobile about a cylindrical wall of the guide chamber.

23. The manual food dicer of claim 1, wherein the guide chamber is comprises a substantially rectangular guiding plate having a circular median opening, and
   a cylindrical wall extending around the circular median opening and surrounding a receiving chamber for receiving the vegetables to be cut.

24. The manual food dicer of claim 23, further comprising a pusher about the cylindrical wall of the guide chamber into which the pusher is fitted and capable of being held by the user so as to move the carriage in a two-way translation along the guiding rails while constantly exerting pressure on vegetables contained in the receiving chamber so as to apply the vegetables against the cross-mounted cutting blade and to enable the vegetables to be cut by the cross-mounted cutting blade.

25. The manual food dicer of claim 1, wherein the longitudinal cutting knife is located on the frame and is configured to be removable from the frame.

26. The manual food dicer of claim 1, wherein the blades of the longitudinal cutting knife are equidistant from each other and are triangular in shape.

\* \* \* \* \*